United States Patent
Goel et al.

(10) Patent No.: US 12,235,192 B2
(45) Date of Patent: Feb. 25, 2025

(54) METHODS AND SYSTEMS FOR ESTIMATING DAMAGE RISK DUE TO DROP OF AN ELECTRONIC DEVICE

(71) Applicant: SAMSUNG ELECTRONICS CO., LTD., Suwon-si (KR)

(72) Inventors: Prash Goel, Bengaluru (IN); Kunal Aggarwal, Bengaluru (IN); Gaurav Gupta, Bengaluru (IN); Arindam Mondal, Bengaluru (IN); Aniroop Mathur, Bengaluru (IN); Archit Tekriwal, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/882,903

(22) Filed: Aug. 8, 2022

(65) Prior Publication Data
US 2023/0029857 A1    Feb. 2, 2023

Related U.S. Application Data

(63) Continuation of application No. PCT/KR2022/008002, filed on Jun. 7, 2022.

(30) Foreign Application Priority Data

Jul. 29, 2021  (IN) ............................. 202141034254
Oct. 27, 2021  (IN) ............................. 202141034254

(51) Int. Cl.
  *G01M 7/08*   (2006.01)
  *G06N 5/022*  (2023.01)

(52) U.S. Cl.
  CPC .............. *G01M 7/08* (2013.01); *G06N 5/022* (2013.01)

(58) Field of Classification Search
  None
  See application file for complete search history.

(56) References Cited

U.S. PATENT DOCUMENTS 8,330,305 B2    12/2012  Hart et al.
9,689,887 B1 *   6/2017  Srinivas ................. G01C 15/00
            (Continued)

FOREIGN PATENT DOCUMENTS

CN    108600538 B    1/2021
CN    108769350 B    3/2021
            (Continued)

OTHER PUBLICATIONS

International Search Report (PCT/ISA/210) issued Sep. 23, 2022 issued by the International Searching Authority in International Application No. PCT/KR2022/008002.
            (Continued)

*Primary Examiner* — Raymond L Nimox
(74) *Attorney, Agent, or Firm* — Sughrue Mion, PLLC

(57) ABSTRACT

Embodiments disclosed herein relate to electronic devices, and more particularly to estimating a damage risk level for an electronic device. A method disclosed herein includes measuring motion parameters of the electronic device, on the electronic device being dropped on a surface. The method further includes classifying the surface into at least one type by processing the measured motion parameters using a classifier module. The method further includes estimating a damage risk score depicting the damage risk level for the electronic device based on the classified surface, the measured motion parameters of the electronic device, and a usage history of the electronic device.

10 Claims, 11 Drawing Sheets

(56) References Cited

U.S. PATENT DOCUMENTS

| | | | |
|---|---|---|---|
| 9,780,621 | B2 | 10/2017 | Rothkopf et al. |
| 10,043,610 | B2 | 8/2018 | Sirimamilla et al. |
| 2019/0064017 | A1* | 2/2019 | Shin .................. G01P 15/0891 |
| 2020/0263960 | A1 | 8/2020 | Shoshan et al. |

FOREIGN PATENT DOCUMENTS

| | | |
|---|---|---|
| CN | 108833671 B | 5/2021 |
| CN | 108197007 B | 6/2021 |
| JP | 2010-38839 A | 2/2010 |
| KR | 10-2020-0101868 A | 8/2020 |
| WO | 2020/093166 A1 | 5/2020 |

OTHER PUBLICATIONS

Writtien Opinion (PCT/ISA/237) dated Sep. 23, 2022 issued by the International Searching Authority in International Application No. PCT/KR2022/008002.

Office Action dated Mar. 16, 2023, issued by Indian Patent Office for Indian Patent Application No. 202141034254.

Communication issued May 2, 2024 by the Intellectual Property Office of India in Indian Patent Application No. 202141034254.

\* cited by examiner

FIG. 6A

| DROP SURFACE | DROP FAILURE RISK | USER RISK LEVEL |
|---|---|---|
| SOFT(Eg.BED,COUCH) | LOW | LOW |
| MEDIUM HARD(Eg.CARPET,RUG) | LOW | HIGH |
| HARD(Eg.TILE,WOOD,CONCRETE) | HIGH | HIGH |

FIG. 6B

| DROP ORIENTATION | DROP FAILURE RISK | USER RISK LEVEL |
|---|---|---|
| SIDE | LOW | HIGH |
| BACK | · LOW FOR PLASTIC BACK<br>· HIGH FOR GLASS BACK | HIGH |
| TOP OR BOTTOM | · MEDIUM FOR FLAT SCREEN<br>· HIGH FOR CURVED SCREEN | HIGH |
| FRONT | HIGH | HIGH |

AI MONITORS THE PHONE DROP
EVENTS AND THEIR SEVERITY

DAMAGE ASSESSMENTS

RECOMMENDING AUTHORIZED
PROTECTIVE CASE AND
RECOMMENDING BUYBACK
PRICING BASED ON
USAGE HISTORY

DROP HISTORY

METHODS AND SYSTEMS FOR ESTIMATING DAMAGE RISK DUE TO DROP OF AN ELECTRONIC DEVICE

CROSS-REFERENCE TO RELATED APPLICATIONS

This application is a bypass continuation of International Application No. PCT/KR2022/008002, filed on Jun. 7, 2022, which is based on and claims priority to IN patent application No. 202141034254 (Provisional Specification) filed on Jul. 29, 2021 in the Indian Patent Office and IN patent application No. 202141034254 (Complete Specification) filed on Oct. 27, 2021 in the Indian Patent Office, the disclosures of which are incorporated by reference herein in their entireties.

BACKGROUND

1. Field

The present disclosure relates to the field of electronic devices and more particularly to estimating a damage risk level due to drop events of an electronic device.

2. Description of the Related Art

Electronic devices may often suffer risk of damage, when accidentally dropped over hard surfaces (such as, a hard floor, a tile, wood, or the like). However, conventional approaches do not involve any mechanisms to estimate a damage risk of the electronic device, after the electronic device has been dropped over the surface.

SUMMARY

The principal object of the embodiments herein is to disclose methods and systems for estimating a damage risk level due to drop events of an electronic device.

Embodiments provided herein disclose methods and systems for detecting a drop event when the electronic device drops and impacts with a surface and measuring at least one motion parameter of the electronic device corresponding to the detected drop event.

Another object of the embodiments herein is to disclose methods and systems for estimating the damage risk level for the detected drop event based on the measured at least one motion parameter of the electronic device, classification of the surface, and a usage history of the electronic device.

Accordingly, the embodiments herein provide methods and systems for estimating a damage risk level due to drop events of an electronic device. A method disclosed herein includes detecting a drop event when the electronic device drops and impacts with a surface. The method includes measuring at least one motion parameter of the electronic device corresponding to the detected drop event. The method includes estimating the damage risk level for the detected drop event, based on the measured at least one motion parameter.

Accordingly, the embodiments herein provide an electronic device comprising a memory, and a controller coupled to the memory. The controller is configured to detect a drop event when the electronic device drops and impacts with a surface. The controller is configured to measure at least one motion parameter of the electronic device corresponding to the detected drop event. The controller is configured to estimate the damage risk level for the detected drop event, based on the measured at least one motion parameter.

Also provided herein is a method for estimating a damage risk level due to drop events of an electronic device, the method including: detecting, by the electronic device, a drop event including an impact of the electronic device with an impact surface: measuring, by the electronic device, at least one motion parameter of the electronic device corresponding to the drop event; and estimating, by the electronic device, the damage risk level for the drop event, based on the measured at least one motion parameter.

In some embodiments of the method, the method includes measuring, by the electronic device, the at least one motion parameter using at least one sensor, wherein the at least one motion parameter includes at least one of one or more acceleration data, a first drop height, a first drop orientation, a direction of bounce, or a fold angle.

In some embodiments of the method, the method includes estimating, by the electronic device, the damage risk level, including: classifying the impact surface into at least one surface type based on the measured at least one motion parameter, wherein the at least one surface type includes one of a hard surface type, a medium surface type, or a soft surface type; determining a drop risk score based on at least one of the classified surface type, the at least one motion parameter, and a usage history, wherein the usage history includes information about a frequency of drops, a first surface on which the electronic device is dropped frequently, a plurality of drop heights, or a plurality of orientations of the electronic device before the impact with the impact surface; and estimating the damage risk level for the drop event based on the drop risk score.

In some embodiments, the classifying the impact surface into the at least one surface type includes: measuring first acceleration data of the electronic device using at least one sensor at a first sampling rate, on detecting a freefall of the electronic device, wherein one or more acceleration data includes the first acceleration data: detecting the impact using the first acceleration data measured at the first sampling rate: setting a second sampling rate, after the electronic device impacts the impact surface: enabling a processor to measure second acceleration data of the electronic device using the at least one sensor at the second sampling rate, wherein the processor includes one of an Application Processor (AP), or a sensor hub, wherein the one or more acceleration data includes the second acceleration data: extracting at least one feature using the second acceleration data measured at the second sampling rate; and processing, with a classifier model, the at least one feature to classify the impact surface as the at least one surface type.

In some embodiments, the classifying the impact surface as the at least one surface type includes: measuring first acceleration data of the electronic device using at least one sensor at a first sampling rate, before detecting a freefall of the electronic device; setting a second sampling rate, when the electronic device is in the freefall; detecting the impact using the first acceleration data of the electronic device measured at the first sampling rate: enabling an application processor (AP) or sensor hub to measure the freefall and post-impact acceleration data using the at least one sensor at the second sampling rate: extracting at least one feature using the measured freefall and the post-impact acceleration data at the second sampling rate; and processing, with a classifier model, the at least one feature to classify the impact surface into the at least one surface type.

In some embodiments, the first acceleration data includes at least one of a first magnitude of an acceleration of the electronic device, a second magnitude of a differential of the acceleration of the electronic device, first local directional components of the acceleration of the electronic device, or second local directional components of the differential of the acceleration of the electronic device; and the at least one feature includes at least one of a correlation of a direction of bounce with the one or more acceleration data, a variance, a waveform length, a covariance, a mean, and frequency domain features including a dominant frequency in Fourier transform, or an energy of an accelerometer magnitude signal.

In some embodiments, the damage risk level for the drop event is estimated as at least one of a low risk, a medium risk, or a high risk.

In some embodiments, the method includes providing, by the electronic device, recommendations to a user of the electronic device based on the damage risk level, wherein the recommendations comprise at least one of device insurance services, a drop history, or commercial services.

Also provided herein is also an electronic device for practicing the above methods, the electronic device including: a memory; and a controller coupled to the memory, the controller configured to: detect a drop event including an impact of the electronic device with an impact surface: measure at least one motion parameter of the electronic device corresponding to the drop event; and estimate a damage risk level for the drop event, based on the measured at least one motion parameter.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIGS. 6A and 6B are example tables depicting the damage risk level and a user risk level estimated based on the classified surface, and a drop orientation, respectively, according to exemplary embodiments as disclosed herein:

DETAILED DESCRIPTION OF EXEMPLARY EMBODIMENTS

Figure 1:
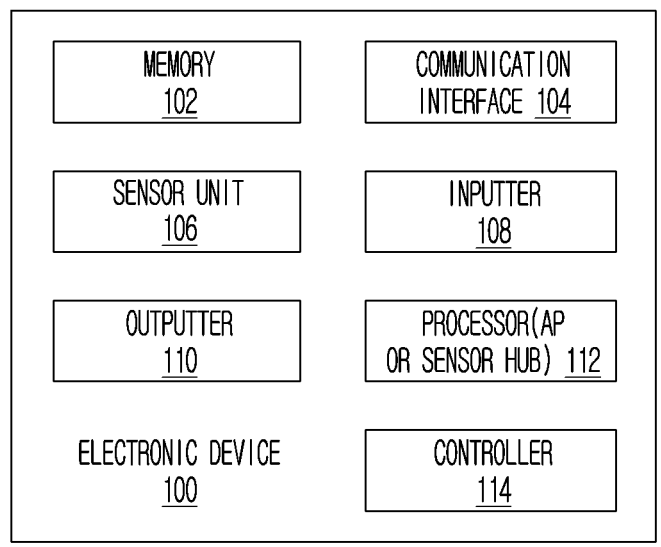
FIG. 1 is an example block diagram depicting components of an electronic device, according to exemplary embodiments as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for estimating a damage risk level due to drop events of an electronic device. Damage risk level includes the probability that the device has been damaged by the drop event that just occurred. Damage risk level also includes the probability that the device will become damaged after a subsequent drop at a later time. Referring now to the drawings, and more particularly to FIGS. 1 through 8, where similar reference characters denote corresponding features consistently throughout the figures, there are shown example embodiments.

FIG. 1 is an example block diagram depicting components of an electronic device 100, according to embodiments as disclosed herein. The electronic device 100 referred herein may be any portable user device, which may be easily carried and moved from one location to another. Examples of the electronic device 100 may be, but are not limited to, a mobile phone, a smartphone, a tablet, a laptop, a wearable device, a foldable device, an Internet of Things (IoT) device, or any other portable device.

In an embodiment, the electronic device 100 may be configured to estimate a damage risk level for one or more drop events. The drop event(s) may involve dropping of the electronic device 100 on a surface. Examples of the surface may be, but are not limited to, a bed, a couch, a carpet, a rug, a tile, wood, concrete, a tabletop, or any other similar region/area. In an example, the damage risk level indicates a risk of damage to the electronic device 100 or components of the electronic device 100, due to the drop event(s) of the electronic device 100. In another example, the damage risk level indicates a battery damage of the electronic device 100. In such a scenario, the damage risk level may be determined based on a drop height and a drop orientation of the electronic device 100. Thus, the damage risk level may be used to monitor the battery damage.

In an example, the electronic device 100 may estimate the damage risk level after every drop event. In another example, the electronic device 100 may estimate the damage risk level once every day. In another example, the electronic device 100 may estimate the damage risk level after a pre-determined number of drop events. Embodiments herein use the terms such as "damage risk level", 'drop risk", "drop risk level", "damage risk", "failure risk", and so on, interchangeably to refer to a risk of damage to the electronic device 100 or the components of the electronic device 100.

In an embodiment, the electronic device 100 may also be configured to provide recommendations to a user, based on the damage risk level estimated for the one or more drop events. Examples of the recommendations may be, but are not limited to, device insurance services, a drop history, commercial services, and so on. The drop history indicates the damage risk level for each of a plurality of drop events of the electronic device 100 monitored over time.

The electronic device 100 includes a memory 102, a communication interface 104, a sensor unit 106, an inputter 108, an outputter 110, a processor 112, and a controller 114. The electronic device 100 may also communicate with one or more external devices using a communication network (not shown) to provide the recommendations to the user. Examples of the external devices may be, but are not limited to, a server, a database, and so on. The communication network may include at least one of, but is not limited to, a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

Figure 2:
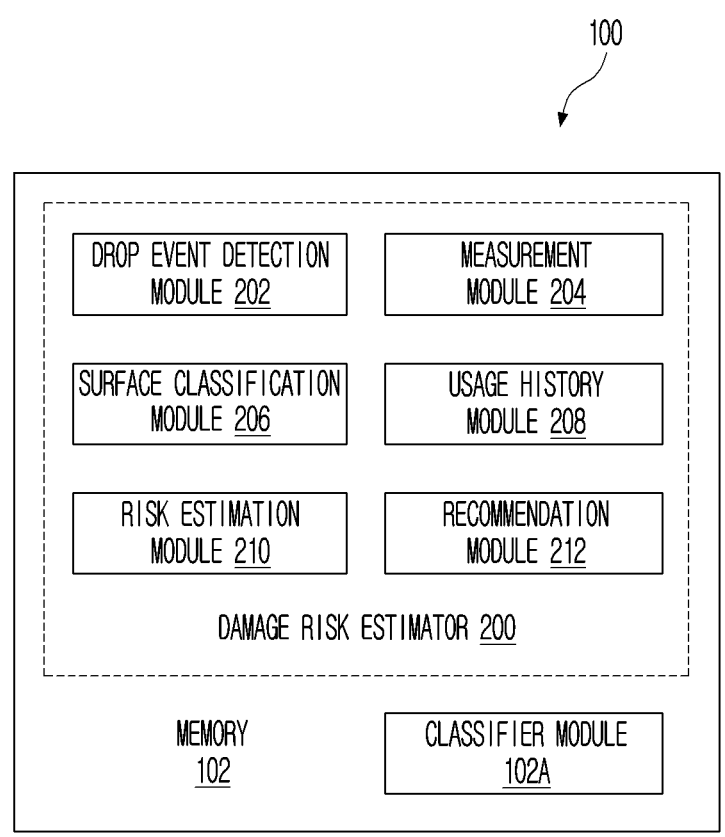
FIG. 2 depicts a damage risk estimator performable in the electronic device for estimating a damage risk level for a drop event of the electronic device, according to exemplary embodiments as disclosed herein.

The memory 102 may store at least one of, one or more applications, the damage risk level, classification of surface on which the electronic device 100 is impacted, usage history of the electronic device 100, the recommendations, and so on. The memory 102 may also store a classifier module 102a (also be referred as a classifier model) (as depicted in FIG. 2), which has been processed by the controller 114 for the classification of the surface. The memory 102 may also store a damage risk estimator 200, which has been processed by the controller 114 for estimating the damage risk level for the electronic device 100. The memory 102 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 104 may include one or more components which enable the electronic device 100 to communicate with the one or more external devices using communication methods that have been supported by the communication network. The communication interface 104 may include the components such as, a wired communicator, a short-range communicator, a mobile/wireless communicator, and a broadcasting receiver. The wired communicator may enable the electronic device 100 to communicate with the external devices using the communication methods such as, but are not limited to, wired LAN, the Ethernet, and so on. The short-range communicator may enable the electronic device 100 to communicate with the external devices using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transceive wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 100 may or may not include the broadcasting receiver.

The sensor unit 106 may be configured to sense, determine or detect the drop event of the electronic device 100. The sensor unit 106 may also be configured to determine motion parameters of the electronic device 100 corresponding to the drop event of the electronic device 100. The sensor unit 106 may include one or more sensors to determine the drop event of the electronic device 100 and the motion parameters of the electronic device 100. Examples of the one or more sensors may be, but are not limited to, an accelerometer, a gyroscope, and so on. Examples of the motion parameters may be, but are not limited to, acceleration data, a drop height, a drop orientation, a direction of bounce, a fold angle, and so on. A function of each sensor may be intuitively inferred by one of ordinary skill in the art based on its name, and thus, its detailed description is omitted.

The inputter 108 may be configured to enable a user to interact with the electronic device 100.

The outputter 110 may be configured to receive information about the estimated damage risk level, and a user risk level for the drop event of the electronic device 100 from the controller 114 and indicate the user about the estimated damage risk level and the user risk level. The user risk level may indicate a risk of dropping the electronic device 100 frequently by the user. The outputter 110 may also receive the recommendations from the controller 114 and indicate the received recommendations to the user. The outputter 110 may include at least one of, for example, as non-limiting examples, a sound outputter/voice assistant module, a display, a vibration motor, a User Interface (UI) module, a light emitting device, and so on, to indicate the damage risk level, the user risk level, and the recommendations to the user. The UI module may provide a specialized UI or graphics user interface (GUI), or the like, synchronized to the electronic device 100, according to the applications. The damage risk level, the user risk level, and the recommendations may be notified in a form of, an audio, a video, an emotion, an image, a button, graphics, text, icons, symbols, vibration signals, and so on.

The processor 112 may be configured to operate on receiving instructions from the controller 114. The processor 112 may be configured to measure the acceleration data of the electronic device 100 using the one or more sensors of the sensor unit 106, at a sampling rate indicated by the controller 114. In an example, the processor 112 may be an Application Processor (AP). In another example, the processor 112 may be a sensor hub. The AP and sensor hub may include at least one of, a single processer, a plurality of processors, multiple homogeneous or heterogeneous cores, multiple Central Processing Units (CPUs) of different kinds, microcontrollers, special media, and other accelerators. The sensor hub may be used for power efficient operations, as the sensor hub operates on low power supply.

The controller 114 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 114 may be configured to control operations of the components 102-112 of the electronic device 100. The controller 114 may also be configured to estimate the damage risk level for the one or more drop events of the electronic device 100.

The controller 114 detects the drop event (also be referred as a drop impact, a drop, or the like), when the electronic device 100 drops and impacts with the surface. The controller 114 may detect the drop event of the electronic device 100 using the one or more sensors of the sensor unit 106. On detecting the drop event, the controller 114 measures the motion parameters of the electronic device 100 corresponding to the detected drop event. The controller 114 enables the one or more sensors of the sensor unit 106 to measure the motion parameters of the electronic device 100, on detecting the drop event. Examples of the motion parameters may be, but are not limited to, acceleration data, a drop height, a drop orientation, a direction of bounce, a fold angle, and so on. For example, the controller 114 may compute the drop orientation using data collected from the gyroscope. In an example, the controller 114 may enable the gyroscope to collect the data, only after detecting the freefall of the electronic device 100.

The controller 114 estimates the damage risk level for the drop event based on the motion parameters measured for the respective drop event.

For estimating the damage risk level, the controller 114 classifies the impacted surface (i.e., the surface on which the electronic device 100 dropped and impacted) into at least one surface type. The surface type may include at least one of, a hard surface, a medium surface, and a soft surface. In an example, the controller 114 may classify the surface after every drop event of the electronic device 100. In another example, the controller 114 may classify the surface once every day. In another example, the controller 114 may classify the surface after a few drop events of the electronic device 100.

In an embodiment, for classifying the surface/impacted surface into the at least one surface type, the controller 114 detects a fall of the electronic device 100 using the one or more sensors of the sensor unit 106. The fall may also be referred to as a freefall. On detecting the freefall of the electronic device 100, the controller 114 measures the acceleration data of the electronic device 100 using the one or more sensors of the sensor unit 106 at a first sampling rate. In an example, the acceleration data of the electronic device 100 includes at least one of: a magnitude of an acceleration of the electronic device 100, a magnitude of differential of the acceleration of the electronic device 100, local x, y, or z components of the acceleration of the electronic device 100, local x, y, or z components of the differential of the acceleration of the electronic device 100, and so on. X, Y and Z may be referred to as directional components. The controller 114 measures the acceleration data based on impact and rebound of the electronic device 100 with respect to the surface. In an example, the controller 114 measures the magnitude of differential of the acceleration of the electronic device 100 as:

magnitude of differential of acceleration=Norm(dAX, dAY,dAZ), where dAX=$d$(AccelX)/$dt$ The controller 114 determines the impact of the electronic device 100 with the surface using the acceleration data measured at the first sampling rate. The controller 114 compares the acceleration data with a pre-defined threshold. The threshold indicates acceleration data above which the impact of the electronic device 100 with the surface may be determined. In an embodiment, the magnitude of the acceleration data/accelerometer magnitude signal that exhibits a high peak at the impact of the electronic device 100 may be used by the controller 114 to define the threshold. In an example, the threshold may be defined as 5 g (50 m/s2). The controller 114 determines the impact of the electronic device 100 with the surface, if the acceleration data measured at the first sampling rate is greater than the pre-defined threshold.

Once the impact of the electronic device 100 with the surface is determined, the controller 114 sets a second sampling rate for measuring the acceleration data. On setting the second sampling rate, the controller 114 enables the processor 112 to measure the acceleration data of the electronic device 100 using the one or more sensors of the sensor unit 106 at the second sampling rate. In an example, the second sampling rate may be the highest sampling rate the sensor can operate at.

In an embodiment, the controller 114 may set the first sampling rate and the second sampling rate based on a sampling capability of the electronic device 100. For example, consider that the electronic device 100 may sample at 400 Hz or at 500 Hz at max. In such a scenario, the controller 114 may set the 400 Hz or the 500 Hz as the second sampling rate and set default rate of 100 Hz as the first sampling rate. Other default rates may be used, for example, 104 Hz.

The controller 114 extracts one or more features from the acceleration data measured by the processor 112 at the second sampling rate. In an example, the one or more features may be, but are not limited to, a correlation of the direction of bounce and the acceleration data, a variance, a zero run, a Max Val, a waveform length, a covariance, a mean, and so on. The zero run may be a maximum contiguous segment for which the magnitude of differential of the acceleration of the electronic device 100 accelerometer magnitude signal is within a certain threshold for example close to zero, for a given period. The Max Val may be a maximum value of the accelerometer magnitude signal over a given period. The waveform length (WL) may be a cumulative length of a waveform over the segment. Resultant values of the wavelength length calculation may indicate a measure of a waveform amplitude, a frequency, and a duration. The covariance measures a joint variability of two random variables in a data set. The mean/variance depicts a mean/variance of the accelerometer magnitude signal over a given period respectively. The correlation measures a relationship between two variables (for example herein, the relationship between the direction of bounce and the acceleration data).

In another example, the one or more features may include frequency domain features such as the highest frequency in the Fourier Transform of data and energy of the accelerometer magnitude signal.

On extracting the one or more features, the controller 114 processes the extracted one or more features using the classifier module 102a to classify the impacted surface into the at least one surface type.

Examples of the classifier module 102a may be, but are not limited to, an Artificial Intelligence (AI) model, a multi-class Support Vector Machine (SVM) model, a Convolutional Neural Network (CNN) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model (with ReLU activation), a deep Q-network, and so on. The classifier module 102a may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the classifier module 102a may vary based on the type of the classifier module 102a. In an example, the classifier module 102a may include an input layer, an output layer, and a hidden layer. The input layer receives a layer input (for example, the features extracted from the acceleration data measured at the second sampling rate) and forwards the received layer input to the hidden layer. The hidden layer transforms the layer input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The classifier module 102a may be trained using at least one learning method to classify the impacted surface into the at least one surface type. Examples of the learning method may be, but are not limited to, supervised learning, unsupervised learning, semi-supervised learning, reinforcement learning, regression-based learning, and so on. The trained classifier module 102a may be a neural network model in which a number of layers, a sequence for processing the layers and parameters related to each layer may be known and fixed for classifying the surface into the at least one surface type. Examples of the parameters related to each layer may be, but are not limited to, activation functions, biases, input weights, output weights, and so on, related to the layers of the classifier module 102a. A function associated with the learning method may be performed through the non-volatile memory, the volatile memory, and the controller 114. The controller 114 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors classify the impacted surface into the at least one surface type in accordance with a predefined operating rule of the classifier module 102a, stored in the non-volatile memory and the volatile memory. The predefined operating rules of the classifier module 102a are provided through training the modules using the learning method.

Here, being provided through learning means that, by applying the learning method to a plurality of learning data (for example: previous classification of the surfaces for drop events monitored over time, features used for the previous classification, or the like), a predefined operating rule or classifier module 102a of a desired characteristic is made. Classification of the surfaces may be performed in the electronic device 100 itself in which the learning according to an embodiment is performed, and/or may be implemented through a separate server/system.

In another embodiment, for classifying the impacted surface, the controller 114 measures the acceleration data of the electronic device 100 at the first sampling rate using the one or more sensors, before detecting the freefall of the electronic device 100. Once the electronic device 100 is in the freefall, the controller 114 detects the impact of the electronic device 100 with the surface using the acceleration data of the electronic device 100 measured at the first sampling rate and sets the second sampling rate. The controller 114 enables the processor 112 (i.e., the AP or the sensor hub) to record the freefall and post impact acceleration data of the electronic device using the one or more sensors of the sensor unit 106 at the second sampling rate. The controller 114 extracts the one or more features using the recorded freefall and the post impact acceleration data at the second sampling rate. The controller 114 processes the extracted one or more features using the classifier module 102a to classify the impacted surface into the at least one surface type.

On classifying the impacted surface into the at least one surface type, the controller 114 determines a drop risk score/damage risk score for the drop event of the electronic device 100 based on at least one of the classified surface, the motion parameters, and the usage history. The usage history depicts usage parameters of the electronic device 100 monitored over time. Examples of the usage parameters of the electronic device 100 may be, but are not limited to, a frequency of drops, the surface on which the electronic device is dropped frequently, drop heights, orientations of the electronic device before impacting with the surface, and so on. The classified surface, the motion parameters, the usage history, or the like may be parameters indicating the potential electronic device damage. For example, a drop of the electronic device 100 on a tile (an example of the classified surface) from a high height (an example of the motion parameters) is more dangerous as compared to a drop of the electronic device 100 on a bed (an example of the classified surface) from a low height (an example of the motion parameters).

The controller 114 estimates the damage risk level for the drop event of the electronic device 100 based on the determined drop risk score. The controller 114 may estimate the damage risk level as at least one of, a low risk, a medium risk, a high risk, or the like. The controller 114 stores the damage risk level and the classification of the surface in the memory 102 for each drop event of the electronic device 100. The controller 114 also determines a user risk level based on the damage risk level, the classification of the surface, the motion parameters, and so on. The user risk level may be determined as at least one of, a low risk, a medium risk, a high risk, or the like.

The controller 114 may also be configured to provide recommendations to the user of the electronic device 100, based on the damage risk level estimated for the one or more drop events of the electronic device 100. The controller 114 may communicate with the one or more external devices to provide the recommendations to the user. Examples of the recommendations may be, but are not limited to, device insurance services, a drop history, commercial services, and so on.

The controller 114 may also be configured to indicate the estimated damage risk level, the user risk level, the recommendations, or the like to the user through the outputter. The controller 114 may also be configured to communicate the estimated damage risk level, the user risk level, the recommendations, or the like, to another user device being used by the user through the communication interface 104.

FIG. 2 depicts the damage risk estimator 200 performable in the electronic device 100 for estimating the damage risk level for the drop event of the electronic device 100, according to embodiments as disclosed herein. The controller 114 processes the damage risk estimator 200 to estimate the damage risk level for the drop event. The damage risk estimator 200 includes a drop event detection module 202, a measurement module 204, a surface classification module 206, a usage history module 208, a risk estimation module 210, and a recommendation module 212.

The drop event detection module 202 may be configured to detect the drop event of the electronic device 100 using the one or more sensors of the sensor unit 106. The drop event includes the dropping/falling of the electronic device 100 over the surface. The drop event detection module 202 provides information about the detected drop event to the measurement module 204, the surface classification module 206, the usage history module 208, and the risk estimation module 210.

The measurement module 204 may be configured to enable the one or more sensors of the sensor unit 106 to measure the motion parameters/extent of motion of the electronic device 100 subsequent to the detected drop event. The measurement module 204 provides the measured motion parameters of the electronic device 100 to the risk estimation module 210.

The surface classification module 206 may be configured to classify the surface with which the electronic device 100 is impacted into the at least one surface type (like the soft surface, the medium surface, the hard surface, and so on).

In an embodiment, for classifying the surface, the surface classification module 206 measures the acceleration data of the electronic device 100 using the one or more sensors at the first sampling rate, on detecting the freefall of the electronic device 100. The surface classification module 206 determines that the electronic device 100 has been impacted with the surface, when the acceleration data measured at the first sampling rate is greater than the pre-defined threshold. The surface classification module 206 sets the second sampling rate, when the electronic device 100 impacts with the surface and enables the AP or sensor hub to measure the acceleration data of the electronic device using the one or more sensors at the second sampling rate. The surface classification module 206 extracts the one or more features using the acceleration data measured at the second sampling rate. On extracting the one or more features, the surface classification module 206 processes the one or more features using the classifier module 102a to classify the surface into at least one of, the soft surface, the medium surface, the hard surface, or the like.

In another embodiment, for classifying the surface, the surface classification module 206 measures the acceleration data of the electronic device 100 using the one or more sensors at the first sampling rate, before detecting the freefall of the electronic device 100. The surface classification module 206 sets the second sampling rate when the electronic device 100 is in the freefall and detects the impact of the electronic device 100 with the surface using the acceleration data of the electronic device 100 measured at the first sampling rate. In this embodiment, the second sampling rate of the accelerometer is set just after detecting freefall, and the accelerometer continues to sample at this rate till and after the impact. Consequently, the sensor hub or the AP access the data at the second sampling rate for the entire duration of the freefall and for the post-impact data collection for the surface classification module. The drop event detection module 202 is independent and the drop event detection module 202 accesses the data at the first sampling rate regardless of a new change request in the sampling rate of the accelerometer. Thus, in an example, the impact is detected at the first sampling rate. Overall, the surface classification module 206 enables the AP or the sensor hub to record the freefall and post impact acceleration data of the electronic device 100 using the one or more sensors at the second sampling rate. The surface classification module 206 extracts the one or more features using the recorded freefall and the post impact acceleration data at the second sampling rate. On extracting the one or more features, the surface classification module 206 processes the one or more features using the classifier module 102a to classify the surface into at least one of, the soft surface, the medium surface, the hard surface, or the like.

The surface classification module 206 provides information about the classification of the surface to the risk estimation module 210.

The usage history module 208 may be configured to fetch the usage history of the electronic device 100 from the memory 102, on detecting the drop event of the electronic device 100. The usage history module 208 provides the fetched usage history to the risk estimation module 210.

The risk estimation module 210 may be configured to estimate the damage risk level for the detected drop event of the electronic device 100. The risk estimation module 210 estimates the damage risk level based on at least one of, the motion parameters measured for the drop event, the classification of surface, the usage history, and so on. The risk estimation module 210 may also be configured to estimate the user risk level based on at least one of, the estimated damage risk level, the motion parameters, the usage history and so on. The risk estimation module 210 provides information about the estimated damage risk level, and the user risk level to the outputter 110 to indicate the estimated damage risk level and the user risk level to the user.

The recommendation module 212 may be configured to provide the recommendations to the user based on the damage risk level estimated for the electronic device 100. The recommendation module 212 provides the recommendations to the user through the outputter 110.

FIGS. 1 and 2 show exemplary blocks of the electronic device 100, but it is to be understood that other embodiments are not limited thereon. In other embodiments, the electronic device 100 may include less or more number of blocks. Further, the labels or names of the blocks are used only for illustrative purpose and does not limit the scope of the embodiments herein. One or more blocks can be combined together to perform same or substantially similar function in the electronic device 100.

Figure 3:
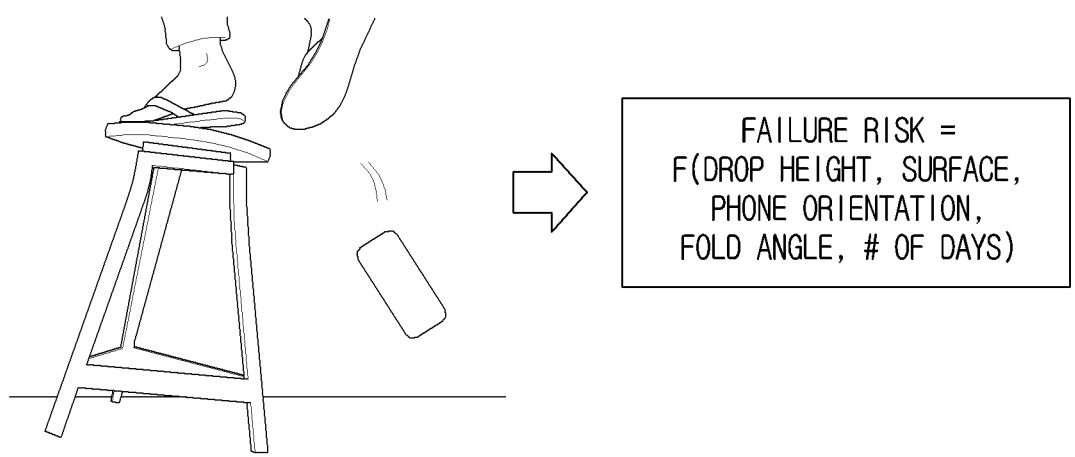
FIG. 3 is an example conceptual diagram depicting estimation of the damage risk level for the drop event of the electronic device, according to exemplary embodiments as disclosed herein.

FIG. 3 is an example conceptual diagram depicting estimation of the damage risk level for the drop event of the electronic device 100, according to embodiments as disclosed herein. Embodiments herein enable the electronic device 100 to estimate the damage risk level on detecting the drop event. The drop event refers to an event wherein the electronic device 100 drops and impacts with the surface.

For estimating the damage risk level, the electronic device 100 measures the motion parameters using the one or more sensors corresponding to the detected drop event. The electronic device 100 also classifies the impacted surface into at least one of, the soft surface, the medium surface, the hard surface, or the like. Classification of the impacted surface is depicted in detail in conjunction with FIGS. 4A, and 4B. The electronic device 100 also fetches the usage history from the memory 102. The electronic device 100 determines the drop risk score based on at least one of, the motion parameters measured for the drop event, the surface type, the usage history, and so on. Based on the determined drop risk score, the electronic device 100 estimates the damage risk level/failure risk for the detected drop event as at least one of, a low risk, a medium risk, and a high risk. The electronic device 100 stores the estimated damage risk level in the memory 102 for every drop event.

Figure 4A:
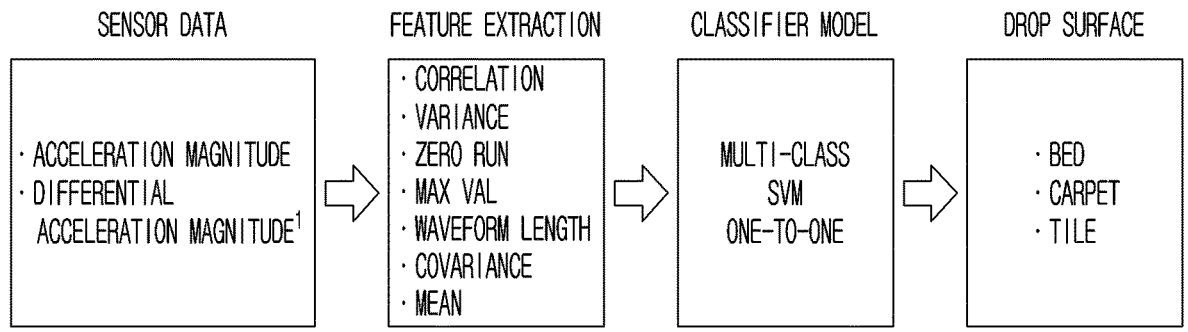
FIGS. 4A, and 4B are example diagrams depicting classification of a surface on which the electronic device is dropped, according to exemplary embodiments as disclosed herein.
Figure 4B:
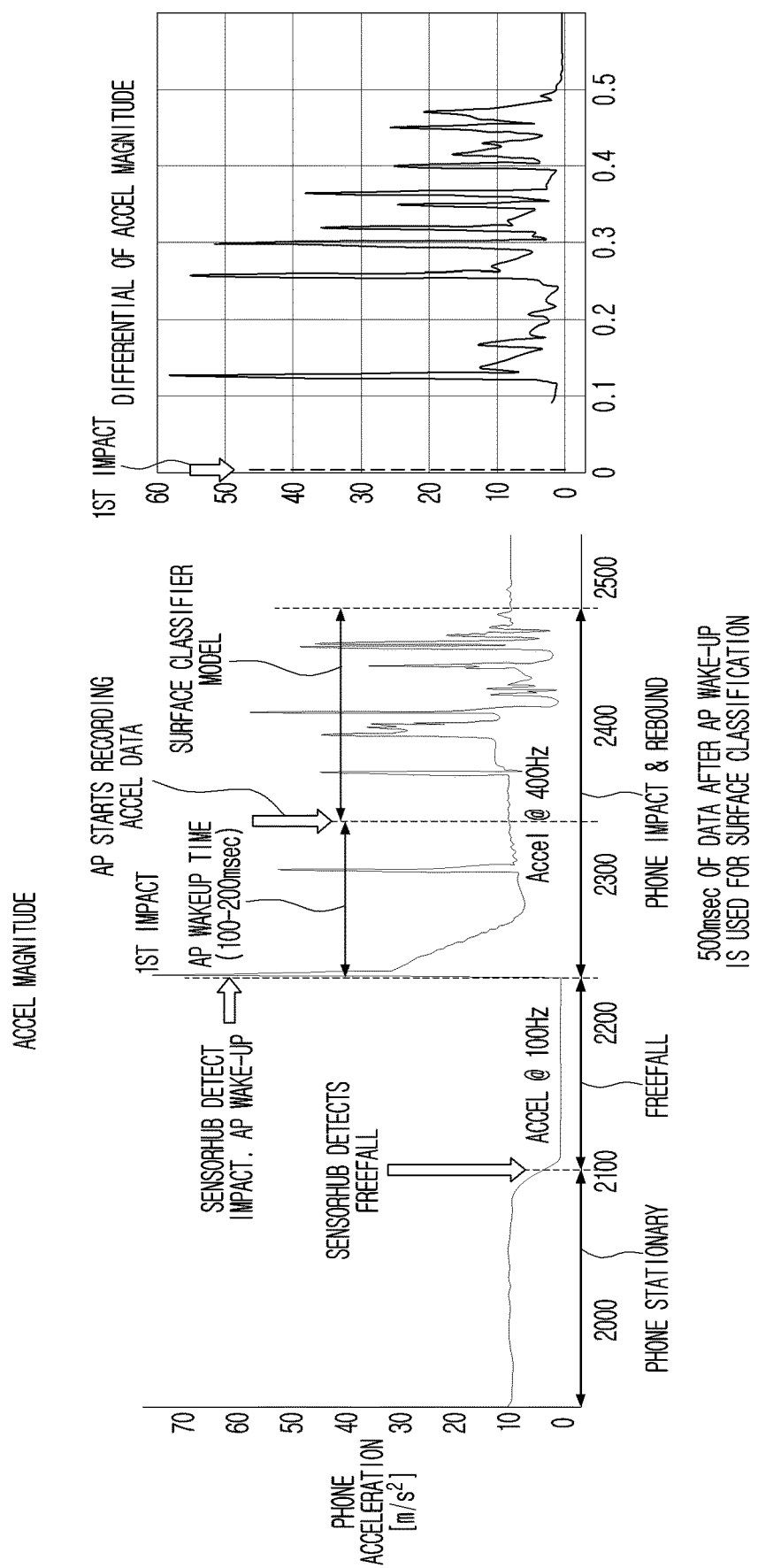

FIGS. 4A, and 4B are example diagrams depicting the classification of the surface on which the electronic device 100 is dropped, according to embodiments as disclosed herein.

For classifying the surface on which the electronic device 100 is dropped, the electronic device 100 measures the acceleration data at the first sampling rate and the second sampling rate. Measuring the acceleration data is described in detail in FIG. 4B.

As depicted in FIG. 4B, the electronic device 100 determines the drop/freefall of the electronic device 100 on the surface using the one or more sensors. On determining the freefall, the electronic device 100 starts collecting the acceleration data at the first sampling rate. In an example, the first sampling rate may be 100 Hertz (Hz). The acceleration data includes at least one of, the magnitude of the acceleration of the electronic device 100, the magnitude of differential of the acceleration of the electronic device 100, or the like. The electronic device 100 uses the acceleration data measured at the first sampling rate to determine the impact of the electronic device 100 with the surface.

FIG. 4B indicates an acceleration of about g (9/8 m/s2) before free fall while the electronic device 100 is stationary. Thus, in an example, the accelerometer output is g while the electronic device 100 is not falling. While the electronic device 100 is falling, the acceleration decreases toward zero (FIG. 4B). Overall, motion of the electronic device 100 corresponds to acceleration values as follows, in an example: i) electronic device 100 is stationery and the acceleration measured by the accelerometer is g~ 9.8 m/s2, as shown in FIG. 4B, ii) the electronic device 100 is in freefall and the acceleration magnitude values are close to 0.0 m/s2, the however the acceleration magnitude is not exactly 0.0 and some positive values occur at times due to some rotation of the electronic device 100, or due to air friction acting on the electronic device 100 during freefall, and iii) the electronic device 100 impacts and rebounds with the impact detected by comparison with some high threshold value of acceleration magnitude, for example 5 g which is approximately 50 m/s2.

Once the electronic device 100 is impacted with the surface, the electronic device 100 enables the AP or the sensor hub to record the acceleration data at the second sampling rate. In an example, the second sampling rate may be 400 Hz, which is the highest sampling rate defined for classifying the surface. The acceleration data recorded at the second sampling rate may be used for classifying the surface. Thus, the acceleration data may be recorded based on the electronic device impact and rebound.

On measuring the acceleration data at the second sampling rate, the electronic device 100 extracts the one or more features such as, but are not limited to, a correlation, a variance, a zero run, a Max Val, a waveform length, a covariance, a mean, and so on, from the acceleration data measured at the second sampling rate.

The electronic device 100 feeds the extracted one or more features to the classifier module 102a. In an example, as depicted in FIG. 4A, the classifier module 102a may be a SVM model. The classifier module 102a processes the received features and classifies the surface into the at least one type (for example, a bed (a soft surface), a carpet (a medium surface), a tile (a hard surface), or the like). The classification of the surface may be performed after every drop of the electronic device 100 or once every day after a few drops of the electronic device 100.

Figure 5:
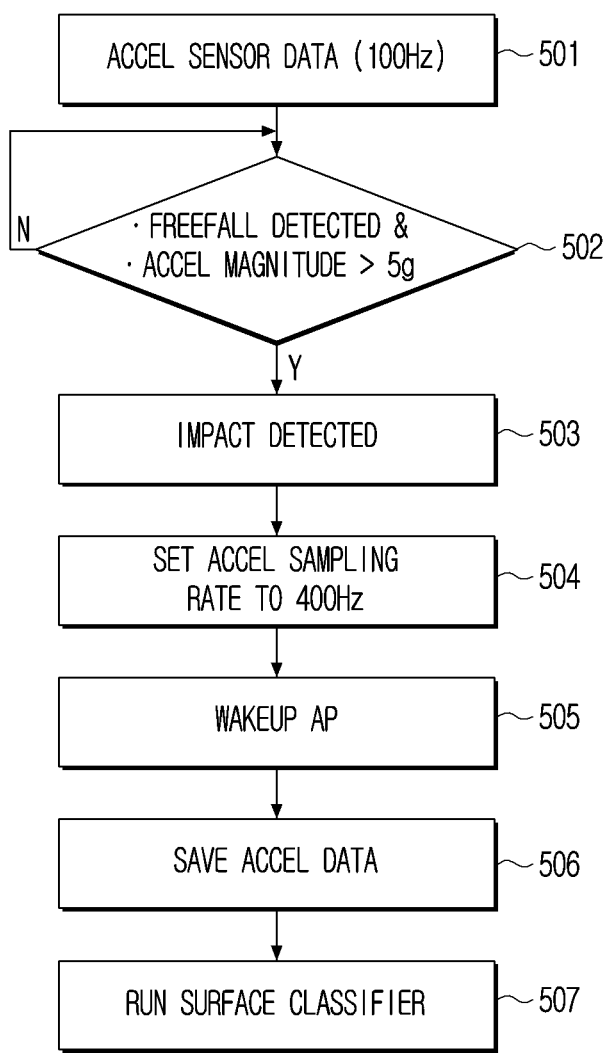
FIG. 5 is an example flow diagram depicting a method for classifying the surface on which the electronic device is dropped, according to exemplary embodiments as disclosed herein.

FIG. 5 is an example flow diagram depicting a method for classifying the surface on which the electronic device 100 is dropped, according to embodiments as disclosed herein.

At step 501, the electronic device 100 initiates measuring the acceleration data at the first sampling rate of 100 Hz (an example sampling rate). At step 502, the electronic device 100 checks if the freefall has been detected and if the magnitude of acceleration is greater than the pre-defined threshold (for example, 5 g, where g is the acceleration of a free falling object toward the earth). The acceleration may refer to the acceleration associated with the impact event. If the freefall is not detected and the magnitude of acceleration of the electronic device 100 is not greater than 5 g, the electronic device 100 performs the step 501.

If the freefall is detected and the magnitude of acceleration of the electronic device 100 is greater than 5 g, at step 503, the electronic device 100 determines that the electronic device 100 is impacted with the surface. On determining the impact with the surface, at step 504, the electronic device 100 sets the sampling rate to the second sampling rate of 400 Hz (an example sampling rate). At step 505, the electronic device 100 wakes up the AP or the sensor hub to measure the acceleration data at the second sampling rate of 400 Hz. At step 506, the electronic device 100 enables the AP or the sensor hub to record the acceleration data measured at the second sampling rate in the memory 102. The acceleration data may be measured using the one or more sensors. The acceleration data measured at the second sampling rate of 400 Hz may be used for classifying the surface on which the electronic device 100 is dropped.

At step 507, the electronic device 100 extracts the features from the acceleration data measured at the second sampling rate of 400 Hz and feeds the extracted features to the classifier module 102a to classify the surface into at least one of, the soft surface, the medium surface, and the hard surface.

FIGS. 6A and 6B are example tables depicting the damage risk level and the user risk level estimated based on the classified surface, and the drop orientation, respectively, according to embodiments as disclosed herein. Embodiments herein estimate the damage risk level for the electronic device 100 based on at least one of, but is not limited to, the classified surface on which the electronic device 100 is dropped, the drop orientation, the drop height, the usage history, and so on.

In an example, the damage risk level and the user risk level estimated based on the classification of surface on which the electronic device 100 is dropped is depicted in an example table of FIG. 6A. The user risk level is based on the usage history and the corresponding damage risk level. As depicted in the example table of FIG. 6A, dropping of the electronic device 100 on the surface like a carpet is an indication that a user is prone to drop the electronic device 100 (i.e., the user risk level is high), even though the damage risk level is low in the corresponding drop event.

In another example, the damage risk level and the user risk level estimated based on the drop orientation of the electronic device 100 is depicted in an example table of FIG. 6B. The drop orientation may alter the damage risk level of the electronic device 100; however, the drop orientation may not be indicative of the user's likelihood of phone breakage.

Figure 7A:
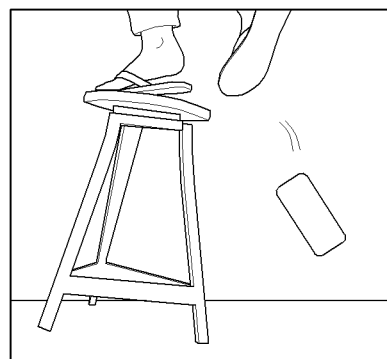
FIGS. 7A and 7B are example use case scenarios of providing recommendations/services to a user based on the damage risk level estimated for the electronic device, according to exemplary embodiments as disclosed herein.
Figure 7A:
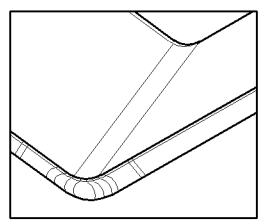
Figure 7A:
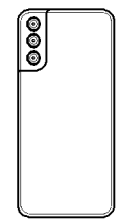
Figure 7A:
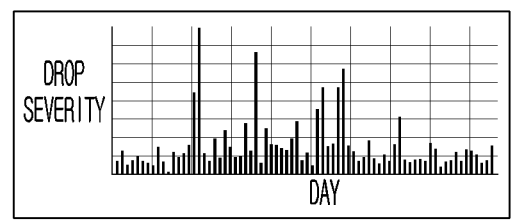
Figure 7B:
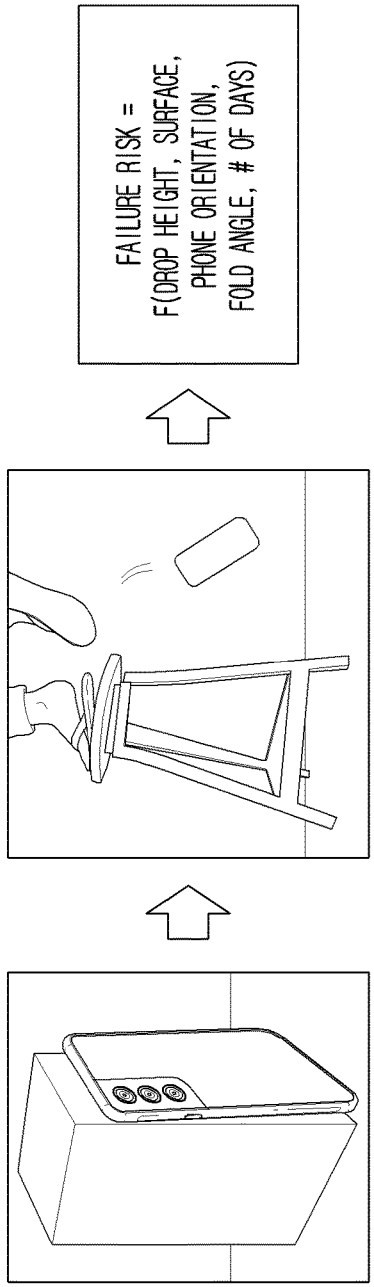
Figure 7B:
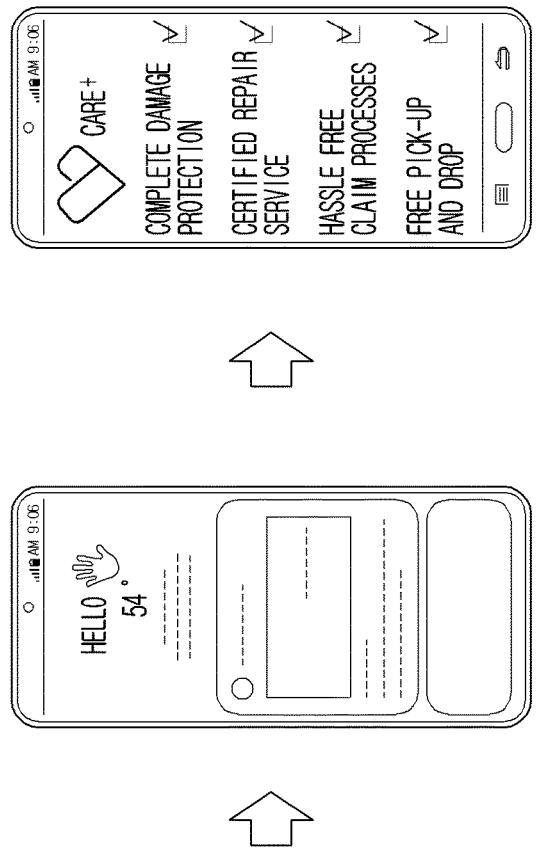

FIGS. 7A and 7B are example use case scenarios of providing the recommendations/services to the user based on the damage risk level estimated for the electronic device 100, according to embodiments as disclosed herein.

As depicted in FIG. 7A, based on the monitored drop events of the electronic device and the associated damage risk level/severity, the electronic device 100 recommends device care services to the user (as depicted in FIG. 7B), if the damage risk level indicates a high risk;

provides a variable pricing based on the usage history;

extends a service plan based on the usage history;

facilitates a better revenue sharing between a manufacturer of the electronic device 100 and an insurance company;

performs damage assessments, for example, performing foldable phone hinge damage assessments, or the like;

recommends a warranty replacement;

recommends superior buyback pricing based on the usage history;

recommends an authorized protective case;

extends a warranty coverage based on the usage history; and presents the drop history to the user under a device health setting page.

As depicted in FIG. 7B, on buying the electronic device 100 by the user, the classifier module 102a may be used for monitoring the drop events of the electronic device 100 and the associated damage risk level/severity. The damage risk level may be estimated as a function of, the classification of the surface, the motion parameters, the usage history, or the like. On estimating the damage risk level, the recommendations may be provided to the user for the device care services. The user may be allowed to sign in for the device care services. In an example, the device care services include at least one of, but is not limited to, complete damage protection, certifier repair services, hassle free claim processes, free pick up and drop services, and so on.

Figure 8:
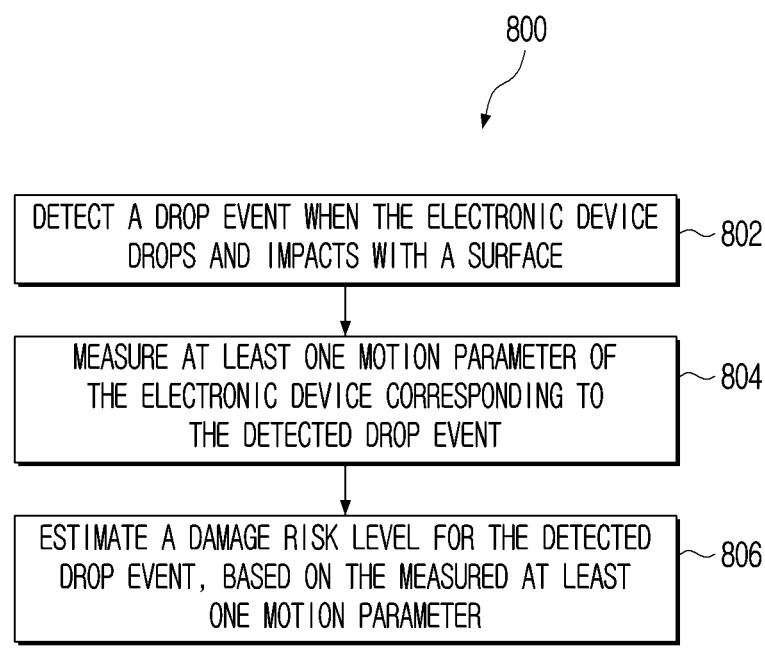
FIG. 8 is a flow diagram depicting a method for estimating the damage risk level for the drop event of the electronic device, according to exemplary embodiments as disclosed herein.

FIG. 8 is a flow diagram 800 depicting a method for estimating the damage risk level for the drop event of the electronic device 100, according to embodiments as disclosed herein.

At step 802, the method includes detecting, by the electronic device 100, the drop event, when the electronic device 100 drops and impacts with the surface.

At step 804, the method includes measuring, by the electronic device 100, the at least one motion parameter of the electronic device 100 corresponding to the detected drop event.

At step 806, the method includes estimating, by the electronic device 100, the damage risk level for the detected drop event, based on the measured at least one motion parameter, the type of the surface, the usage history, and so on. The various actions in method 800 may be performed in the order presented, in a different order or simultaneously. Further, in some embodiments, some actions listed in FIG. 8 may be omitted.

The embodiments disclosed herein can be implemented through at least one software program running on at least one hardware device and performing network management functions to control the elements. The elements shown in FIGS. 1, and 2 can be at least one of a hardware device, or a combination of hardware device and software module.

The embodiments disclosed herein describe methods and systems for estimating damage risk due to drop of an electronic device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, embodiments may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for estimating a damage risk level due to drop events of an electronic device, the method comprising:

detecting, by the electronic device, a drop event comprising an impact of the electronic device with an impact surface;

measuring, by the electronic device, at least one motion parameter of the electronic device corresponding to the drop event; and estimating, by the electronic device, the damage risk level for the drop event, based on the measured at least one motion parameter,
wherein estimating, by the electronic device, the damage risk level comprises:
classifying the impact surface into at least one surface type based on the measured at least one motion parameter, wherein the at least one surface type includes one of a hard surface type, a medium surface type, or a soft surface type; and
estimating the damage risk level for the drop event based on at least one of the classified surface type, the at least one motion parameter, and a usage history, wherein the usage history comprises information about a frequency of drops, a first surface on which the electronic device is dropped frequently, a plurality of drop heights, or a plurality of orientations of the electronic device before the impact with the impact surface,
wherein classifying the impact surface into the at least one surface type comprises:
measuring first acceleration data of the electronic device using at least one sensor at a first sampling rate, on detecting a freefall of the electronic device, wherein one or more acceleration data comprises the first acceleration data;
detecting the impact using the first acceleration data measured at the first sampling rate;
setting a second sampling rate, after the electronic device impacts the impact surface;
enabling a processor to measure second acceleration data of the electronic device using the at least one sensor at the second sampling rate, wherein the processor includes one of an Application Processor (AP), or a sensor hub, wherein the one or more acceleration data comprises the second acceleration data;
extracting at least one feature using the second acceleration data measured at the second sampling rate; and
processing, with a classifier model, the at least one feature to classify the impact surface as the at least one surface type.

2. The method of claim 1, wherein measuring, by the electronic device, the at least one motion parameter using at least one sensor, wherein the at least one motion parameter includes at least one of one or more acceleration data, a first drop height, a first drop orientation, a direction of bounce, or a fold angle.

3. A method for estimating a damage risk level due to drop events of an electronic device, the method comprising:
detecting, by the electronic device, a drop event comprising an impact of the electronic device with an impact surface;
measuring, by the electronic device, at least one motion parameter of the electronic device corresponding to the drop event; and
estimating, by the electronic device, the damage risk level for the drop event, based on the measured at least one motion parameter,
wherein estimating, by the electronic device, the damage risk level comprises:
classifying the impact surface into at least one surface type based on the measured at least one motion parameter, wherein the at least one surface type includes one of a hard surface type, a medium surface type, or a soft surface type; and
estimating the damage risk level for the drop event based on at least one of the classified surface type, the at least one motion parameter, and a usage history, wherein the usage history comprises information about a frequency of drops, a first surface on which the electronic device is dropped frequently, a plurality of drop heights, or a plurality of orientations of the electronic device before the impact with the impact surface,
wherein the classifying the impact surface as the at least one surface type includes:
measuring first acceleration data of the electronic device using at least one sensor at a first sampling rate, before detecting a freefall of the electronic device;
setting a second sampling rate, when the electronic device is in the freefall;
detecting the impact using the first acceleration data of the electronic device measured at the first sampling rate;
enabling an application processor (AP) or sensor hub to measure the freefall and post-impact acceleration data using the at least one sensor at the second sampling rate;
extracting at least one feature using the measured freefall and the post-impact acceleration data at the second sampling rate; and
processing, with a classifier model, the at least one feature to classify the impact surface into the at least one surface type.

4. The method of claim 1, wherein
the first acceleration data includes at least one of a first magnitude of an acceleration of the electronic device, a second magnitude of a differential of the acceleration of the electronic device, first local directional components of the acceleration of the electronic device, or second local directional components of the differential of the acceleration of the electronic device; and
the at least one feature includes at least one of a correlation of a direction of bounce with the one or more acceleration data, a variance, a waveform length, a covariance, a mean, and frequency domain features including a dominant frequency in Fourier transform, or an energy of an accelerometer magnitude signal.

5. The method of claim 1, wherein the damage risk level for the drop event is estimated as at least one of a low risk, a medium risk, or a high risk.

6. The method of claim 1, further comprising providing, by the electronic device, recommendations to a user of the electronic device based on the damage risk level, wherein the recommendations comprise at least one of device insurance services, a drop history, or commercial services.

7. An electronic device comprising:
a memory; and
a controller coupled to the memory, the controller configured to:
detect a drop event comprising an impact of the electronic device with an impact surface;
measure at least one motion parameter of the electronic device corresponding to the drop event; and
estimate a damage risk level for the drop event, based on the measured at least one motion parameter,
wherein the controller is further configured to:
classify the impact surface into at least one surface type based on the measured at least one motion parameter, wherein the at least one surface type includes one of a hard surface type, a medium surface type, or a soft surface type; and
estimate the damage risk level for the drop event based on at least one of the classified surface type, the at least one motion parameter, or a usage history, wherein the usage history comprises information about a frequency of drops, a first surface on which the electronic device is dropped frequently, a plurality of drop heights, or a plurality of orientations of the electronic device before the impact with the impact surface, wherein the controller is further configured to:

measure first acceleration data of the electronic device using at least one sensor at a first sampling rate, on detecting a freefall of the electronic device, wherein one or more acceleration data comprises the first acceleration data;

detect the impact using the first acceleration data measured at the first sampling rate;

set a second sampling rate, after the electronic device impacts the impact surface;

enable a processor to measure second acceleration data of the electronic device using the at least one sensor at the second sampling rate, wherein the processor includes one of an Application Processor (AP) or a sensor hub, wherein the one or more acceleration data comprises the second acceleration data;

extract at least one feature using the second acceleration data measured at the second sampling rate; and process, with a classifier model, the at least one feature to classify the impact surface as the at least one surface type.

8. The electronic device of claim 7, wherein the controller is further configured to measure the at least one motion parameter using at least one sensor, wherein the at least one motion parameter includes at least one of one or more acceleration data, a first drop height, a first drop orientation, a direction of bounce, or a fold angle.

9. The electronic device of claim 7, wherein the first acceleration data of the electronic device includes at least one of a first magnitude of an acceleration of the electronic device, a second magnitude of a differential of the acceleration of the electronic device, first local directional components of the acceleration of the electronic device, or second local directional components of the differential of the acceleration of the electronic device; and the at least one feature includes at least one of a correlation of a direction of bounce and the one or more acceleration data, a variance, a waveform length, a covariance, a mean, and frequency domain features including a dominant frequency in Fourier transform, or an energy of an accelerometer magnitude signal.

10. The electronic device of claim 7, wherein the damage risk level for the drop event is estimated as at least one of a low risk, a medium risk, or a high risk.

* * * * *